(12) United States Patent
Kuwano (10) Patent No.: US 6,359,523 B1
(45) Date of Patent: Mar. 19, 2002

(54) ORTHOGONAL MODULATOR, MOBILE TERMINAL AND COMMUNICATION SYSTEM

(75) Inventor: Akira Kuwano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/604,979

(22) Filed: Jun. 28, 2000

(30) Foreign Application Priority Data

Jul. 2, 1999 (JP) ............................................ 11-189593

(51) Int. Cl.$^7$ .............................................. H04L 27/36
(52) U.S. Cl. ...................... 332/103; 332/105; 375/261; 375/285; 375/298
(58) Field of Search ................................. 332/103, 104, 332/105; 375/261, 284, 285, 298

(56) References Cited

U.S. PATENT DOCUMENTS 5,162,763 A * 11/1992 Morris ......................... 332/170
5,396,196 A * 3/1995 Blodgett ........................ 332/103

FOREIGN PATENT DOCUMENTS

| JP | 04275746 A | 10/1992 |
| JP | 06303145 A | 10/1994 |
| JP | 07162466 A | 6/1995 |
| JP | 07202961 A | 8/1995 |
| JP | 11027170 A | 1/1999 |
| JP | 11027331 A | 1/1999 |

* cited by examiner

Primary Examiner—Siegfried H. Grimm
(74) Attorney, Agent, or Firm—Young & Thompson (57) ABSTRACT

An orthogonal modulator capable of eliminating an offset component between an I signal and a Q signal. The orthogonal modulator includes a generation circuit for generating a plurality of base band signals such as voice signal, a mixing circuit for mixing the base band signals and a plurality of carrier waves, an extraction circuit for extracting each DC offset component generated by the generation circuit or the mixing circuit, a comparison circuit for comparing the DC offset components thus extracted with each other, an addition circuit for adding a plurality of comparison results with other comparison results, and an offset elimination circuit for eliminating the DC offset components included in a plurality of addition signals by subtracting the DC offset components from the base band signals before they are applied to the mixing circuit.

6 Claims, 7 Drawing Sheets

ORTHOGONAL MODULATOR, MOBILE TERMINAL AND COMMUNICATION SYSTEM

BACKGROUND OF THE INVENTION

1. Technical Field of the Invention

The present invention relates to an orthogonal modulator for removing a DC offset component of each of a plurality of base band signals, a mobile terminal comprising the orthogonal modulator, and a communication system including such mobile terminals.

2. Description of the Prior Art

Conventionally, a mobile terminal such as a cellular phone has employed the orthogonal modulation by which a digital voice signal (base band signal) is transmitted, for example, by two carrier waves having different phases by 90°.

More specifically, the conventional mobile terminal amplifies and modulates an I channel base band signal (I signal), a Q channel base band signal (Q signal) with a carrier wave having an orthogonal relationship by means of the orthogonal modulator and then adds them, thereby obtaining a modulated output signal.

However, in the case in which the orthogonal modulator or the base band signal input thereto has DC offset, the carrier leak appears due to the DC offset over a modulated wave obtained by the orthogonal modulator. Therefore, there have been developed several techniques for suppressing the carrier leak.

Figure 5:
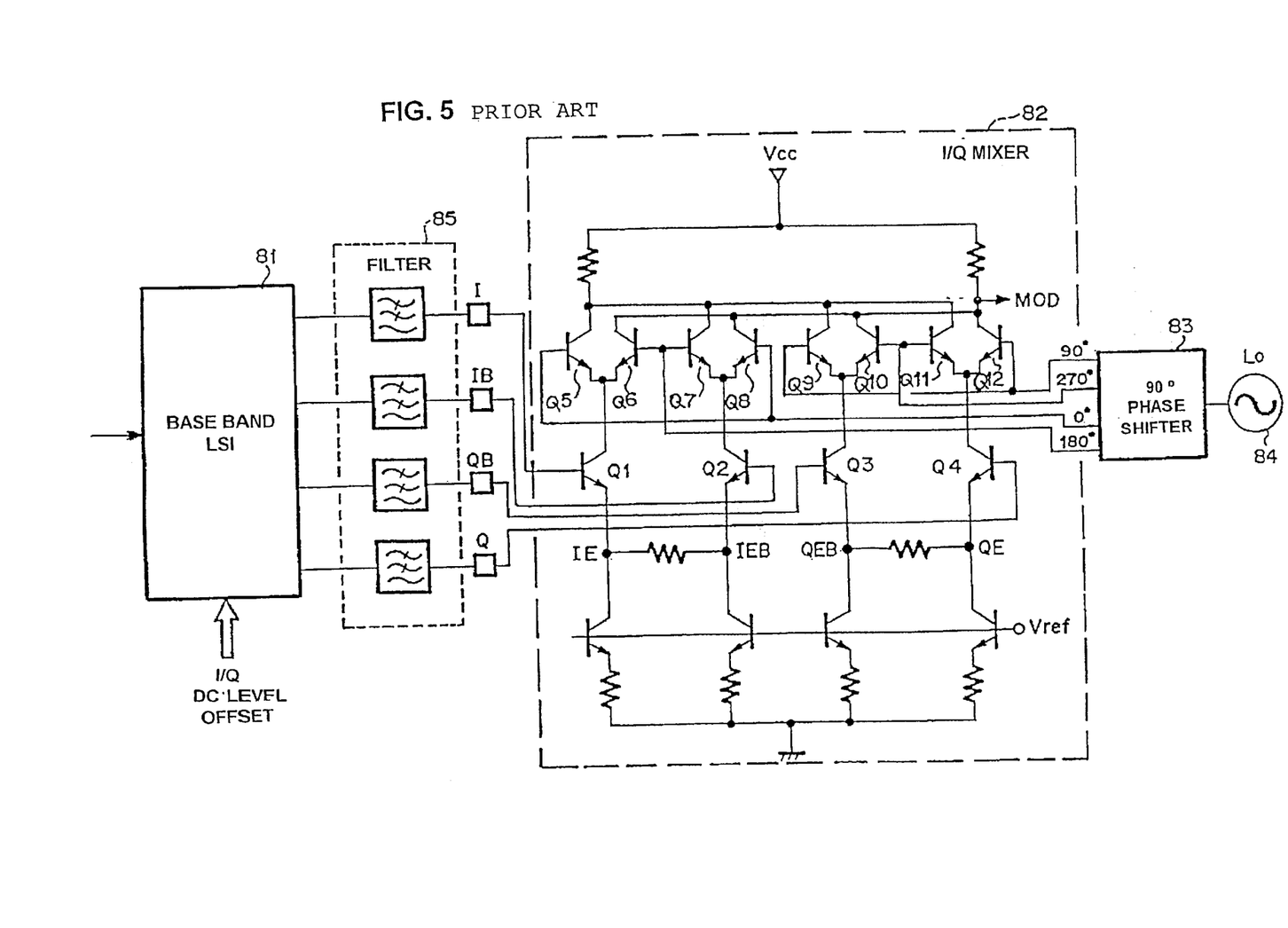
FIG. 5 is a diagram showing the structure of a conventional orthogonal modulator.

The conventional orthogonal modulator as shown in FIG. 5 comprises base band LSI 81 for generating an I signal and a Q signal and an IB signal and a QB signal of which phases are inverted thereto by 90° phase shifter 83 for modulating the phase of the output carrier wave source 84, and I/Q mixer 82 such as a Gilbert multiplier for mixing the output signal of the base band LSI 81 and the output signal of the 90° phase shifter 83 through filter 85.

The operation of the orthogonal modulator shown in FIG. 5 is explained below. The base band LSI 81 inputs an I/Q DC level offset setting signal from non-shown ROM, and outputs an I signal, a Q signal, an IB signal and a QB signal. The IB signal and the QB signal are generated in order to operate the I/Q mixer 82 in good balance.

Moreover, the I/Q DC level offset setting signal is decided so as to minimize the carrier leak of an MOD signal (modulated wave) outputted from an MOD terminal of the I/Q mixer 82. In other words, the carrier leak is suppressed in response to the I/Q DC level offset setting signal.

A pair of I and IB base band signals and a pair of Q and QB base band signals are inputted into transistors Q1 to Q4 of the I/Q mixer 82 through the filter 85.

Moreover, transistors Q5 to Q12 of the I/Q mixer 82 input, in a predetermined configuration, a 0° carrier wave, a 90° carrier wave, a 180° carrier wave and a 270° carrier wave which are outputted from the carrier wave source 84 through the 90° phase shifter 83.

These carrier waves and each base band signal are mixed and are transmitted from MOD terminal to the air. Thus, the carrier leak of the MOD signal is minimized.

Figure 6:
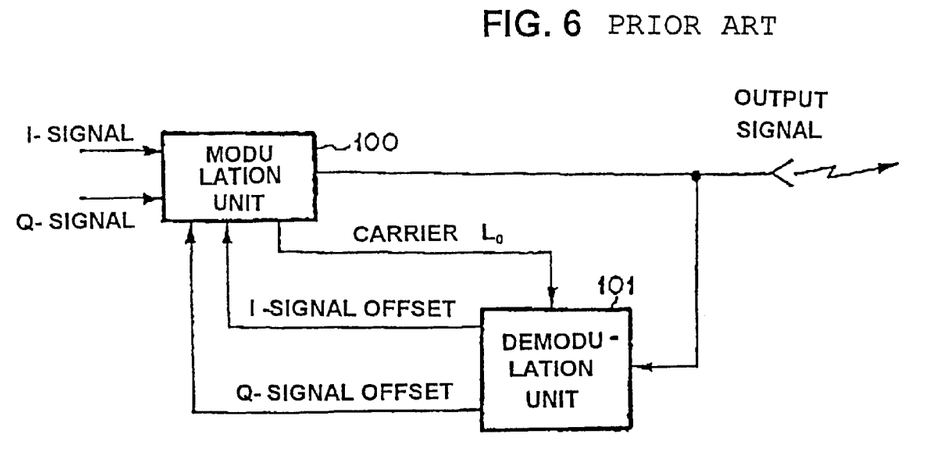
FIG. 6 is a diagram showing the structure of another conventional orthogonal modulator.

FIG. 6 is a block diagram of a carrier leak suppressing circuit as an orthogonal modulator disclosed in JP 6-303145 A, 1994. Orthogonal modulation unit 100 inputs the I and Q signals having phases different from each other by 90° and outputs an orthogonal modulating signal. A part of the orthogonal modulating signal is inputted into demodulation unit 101. The demodulation unit 101 inputs a carrier Lo outputted from the orthogonal modulation unit 100.

The demodulation unit 101 demodulates the inputted signal into the I and Q signals. The DC offset component of the I signal and the DC offset component of the Q signal thus demodulated are fed back to the orthogonal modulation unit 100 in order to remove the DC offset components from the I and Q signals. Thus, the carrier leak of the modulated wave is suppressed.

Figure 7:
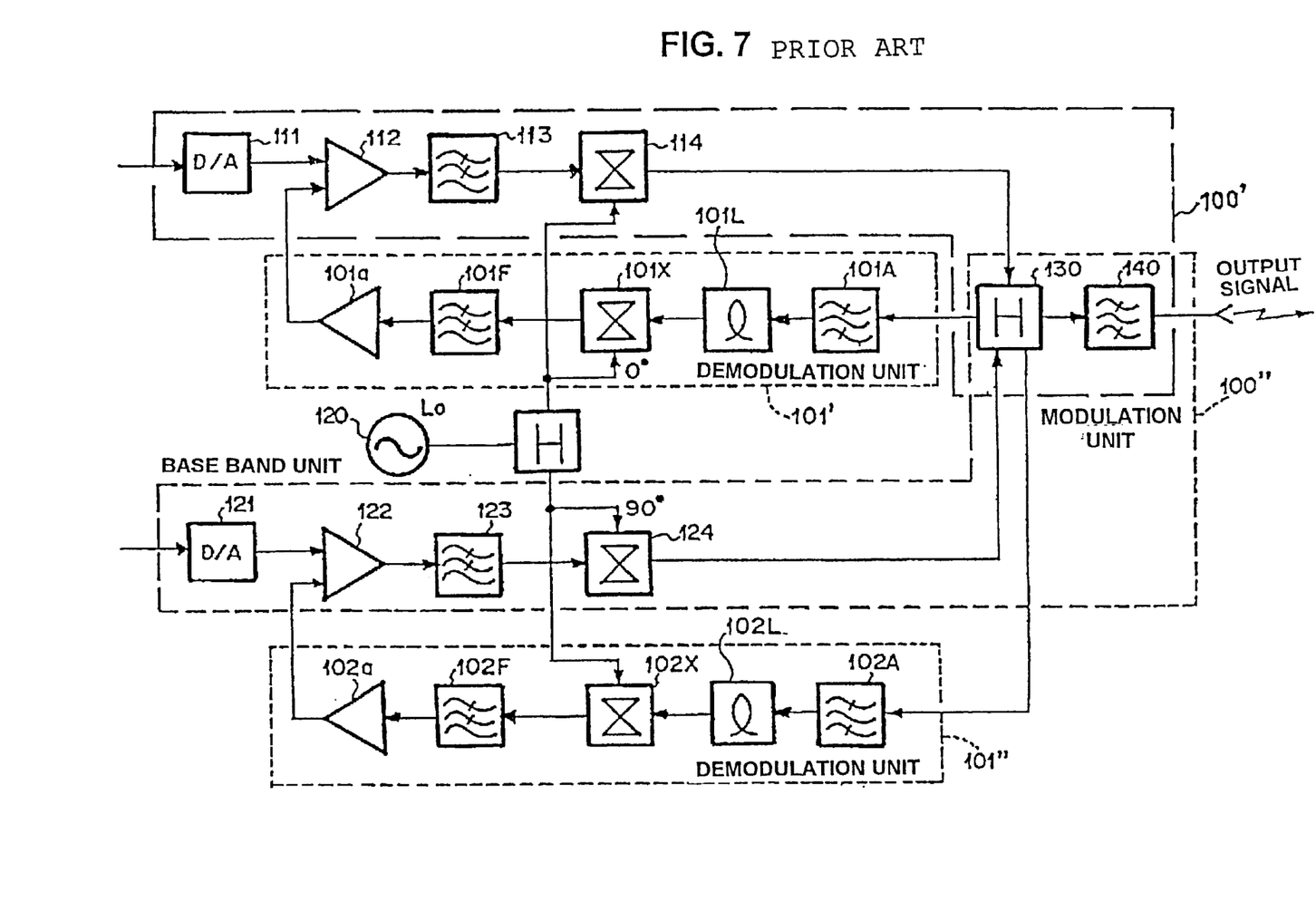
FIG. 7 is a diagram showing the specific structure of FIG. 6.

A specific structure of carrier leak suppressing circuit as shown in FIG. 6 is shown in FIG. 7.

The orthogonal modulation unit 100' modulates the I signal, while the orthogonal modulation unit 100" modulates the Q signal. Further, demodulation unit 101' demodulates the I signal, while demodulation unit 101" demodulates the Q signal.

Each of the I and Q signals is converted from a digital signal into an analog signal by D/A converters 111 and 121, is subjected to a predetermined processing in operational amplifiers 112 and 122 and roll-off filters 113 and 123, and is outputted into mixers 114 and 124 together with carrier waves 0° and 90° which are the outputs of a local oscillator 120.

Then, the I and Q signals and the orthogonal carrier wave are mixed and amplitude-modulated. Thus, an orthogonal modulating signal is outputted from the antenna. A part of the orthogonal modulating signal is inputted into demodulation units 101' and 101". The offset components are extracted by band pass filters 101A and 102A, tuned to the timing of the carrier on the modulation side by means of delay elements 101L and 102L and are outputted into demodulating mixers 101X and 102X.

The demodulating mixers 101X and 102X also input the orthogonal carrier waves 0° and 90°, mix the output signals of the delay elements 101L and 102L and the orthogonal phase carrier waves, thereby detecting DC offset components. The DC offset component is integrated by low-pass filters 101F and 102F and is fed back to the operational amplifiers 112 and 122 through amplifiers 101a and 102a.

Each of the operational amplifiers 112 and 122 calculates a difference between the output signal of the D/A converter and the output signals 101a and 102a and remove the DC offset components. A base band signal from which the DC offset component is removed is outputted into composite hybrid 130 through the roll-off filters 113 and 123 and the mixers 114 and 124. The output from the mixer 114 and the output signal from the mixer 124 are mixed and the mixed signal is outputted to the outside of the orthogonal modulator through the band pass filter 140.

In the conventional orthogonal modulator as shown in FIG. 5, the base band LSI generates each base band signal in response to the I/Q DC level offset setting signal output from the ROM. However, the carrier leak of the modulated wave obtained from the base band signal cannot be always decreased. The DC offset between the I and Q signals of the base band LSI and mixer circuit does not always have a mutual relationship, due to variations in manufacturing processes and environmental conditions such as an ambient temperature, or light.

Moreover, the set value of the I/Q DC level offset cannot be changed because it is stored in the ROM. For this reason, it is impossible to carry out correction corresponding to a variation in the DC offset between the I and Q signals of the base band LSI and mixer circuit and the like.

Furthermore, in the conventional orthogonal modulator as shown in FIG. 5, when the DC levels of the I and Q signals outputted from the base band LSI are lowered, the voltage between the collector and the emitter of the transistor of the I/Q mixer is also lowered, so that a constant current does not flow to the I/Q mixer. Consequently, the modulating signal loses its linearity with respect to the I/Q signal and an I/Q tertiary modulation distortion is increased.

In the conventional orthogonal modulator as shown in FIG. 6, the modulated signal is demodulated into the I and Q signals and the DC offset component of the I signal and the DC offset component of the Q signal are fed back to the orthogonal modulation unit. However, there is no feedback loop for removing the DC offset component between the I signal and the Q signal. For this reason, it is impossible to remove the carrier leak by the DC offset component between the I signal and the Q signal.

Moreover, the power consumption of the demodulation unit is almost equivalent to that of the orthogonal modulation unit. Accordingly, the power consumption as a whole circuit as shown in FIG. 6 is increased to almost a double as compared with the orthogonal modulator according to the circuit as shown in FIG. 5.

Further, in the conventional orthogonal modulator as shown in FIG. 7, it is difficult to design an accurate band pass filter suitable for an integrated circuit.

SUMMARY OF THE INVENTION

Therefore, an object of the present invention is to provide an orthogonal modulator capable of removing the DC offset component between the I signal and the Q signal.

Another object of the present invention is to prevent an increase in the tertiary modulation distortion of the I signal and the Q signal.

The orthogonal modulator of the present invention comprises: a generation means for generating a plurality of base band signals from a transmitted signal such as a voice signal; a mixing means for mixing the base band signals and a plurality of carrier waves; an extraction means for extracting each DC offset component generated by the generation means or the mixing means in response to the base band signals; a comparison means for comparing the DC offset components thus extracted with each other; an addition means for adding a plurality of comparison result signals obtained as a result of the comparison to other comparison result signals; and an offset elimination means for eliminationg the DC offset components included in a plurality of addition signals obtained as a result of the addition from the base band signals.

Moreover, the present invention provides a mobile terminal comprising voice collecting means for collecting a voice generated by a user, the orthogonal modulator for inputting and orthogonally modulating a voice signal output from the voice collecting means, and transmitting means for transmitting an orthogonal modulating signal output from the orthogonal modulator.

Furthermore, the present invention provides a communication system comprising the mobile terminal, and a base station for transmitting and receiving electric waves to and from the mobile terminal.

According to the present invention, as described above, in the case in which a plurality of base band signals and a plurality of carrier waves orthogonal thereto are to be mixed, the DC offset components of the base band signals are extracted from the mixing means and are fed back and removed from the base band signals. Accordingly, it is possible to provide the orthogonal modulator capable of removing the offset component between the I signal and the Q signal.

PREFERRED EMBODIMENT OF THE INVENTION

Preferred embodiments of the present invention are described below with reference to the drawings.

Figure 1:
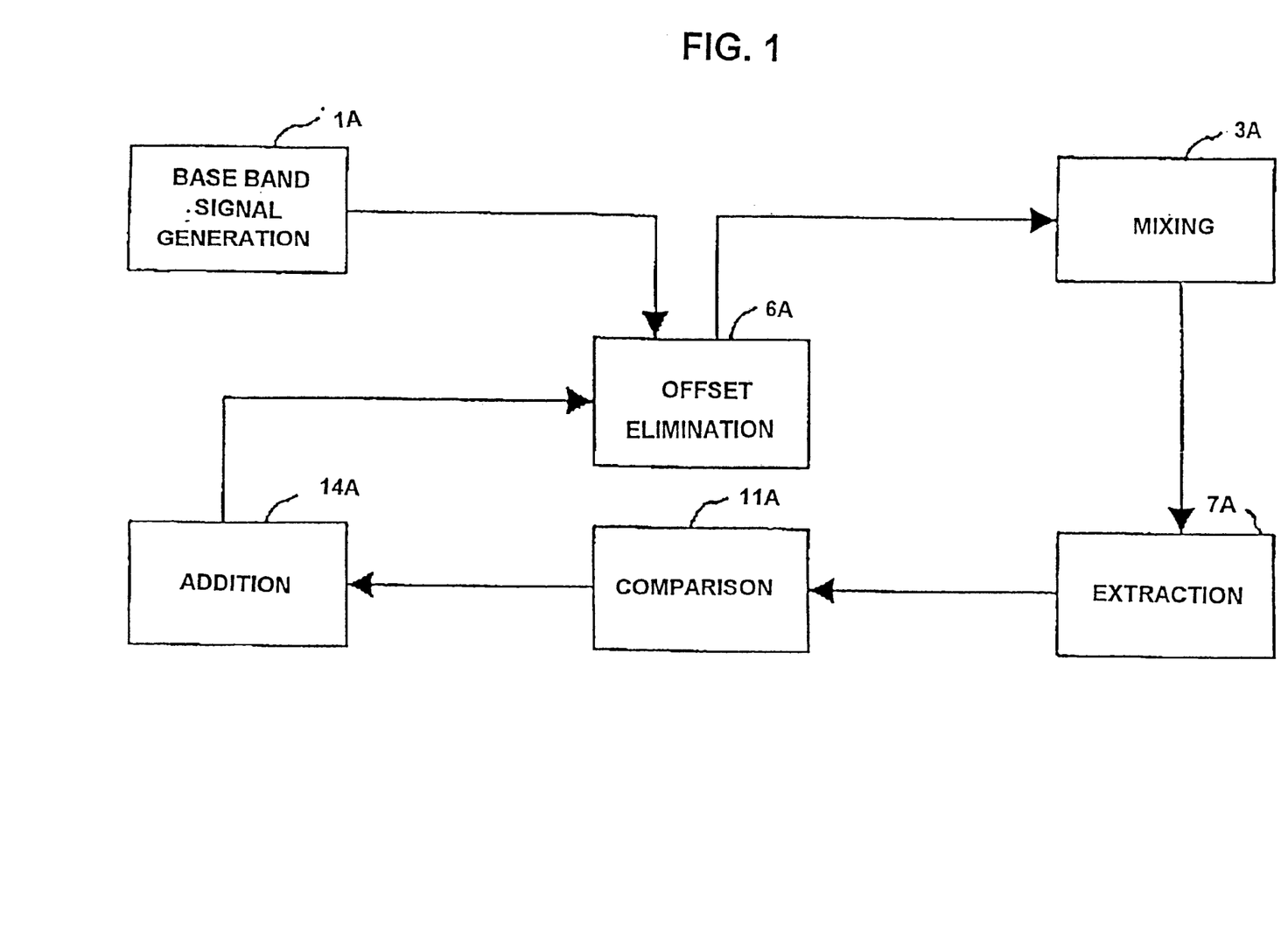
FIG. 1 is a conceptual diagram showing an orthogonal modulator of the present invention.

FIG. 1 is a conceptual diagram showing an orthogonal modulator of the present invention. The orthogonal modulator shown in FIG. 1 comprises generation means 1A for inputting a voice signal, an image signal and the like transmitted from non-shown transmitter, mixing means 3A for mixing the base band signals and a plurality of carrier waves, extraction means 7A for extracting each DC offset component generated by the generation means 1A or the mixing means 3A in response to the base band signals, comparison means 11A for comparing the extracted DC offset components with each other, addition means 14A for adding a plurality of comparison results to other comparison results, and offset elimination means 6A for eliminating the DC offset component including a plurality of addition signals obtained as a result of the addition from the base band signals.

Figure 2:
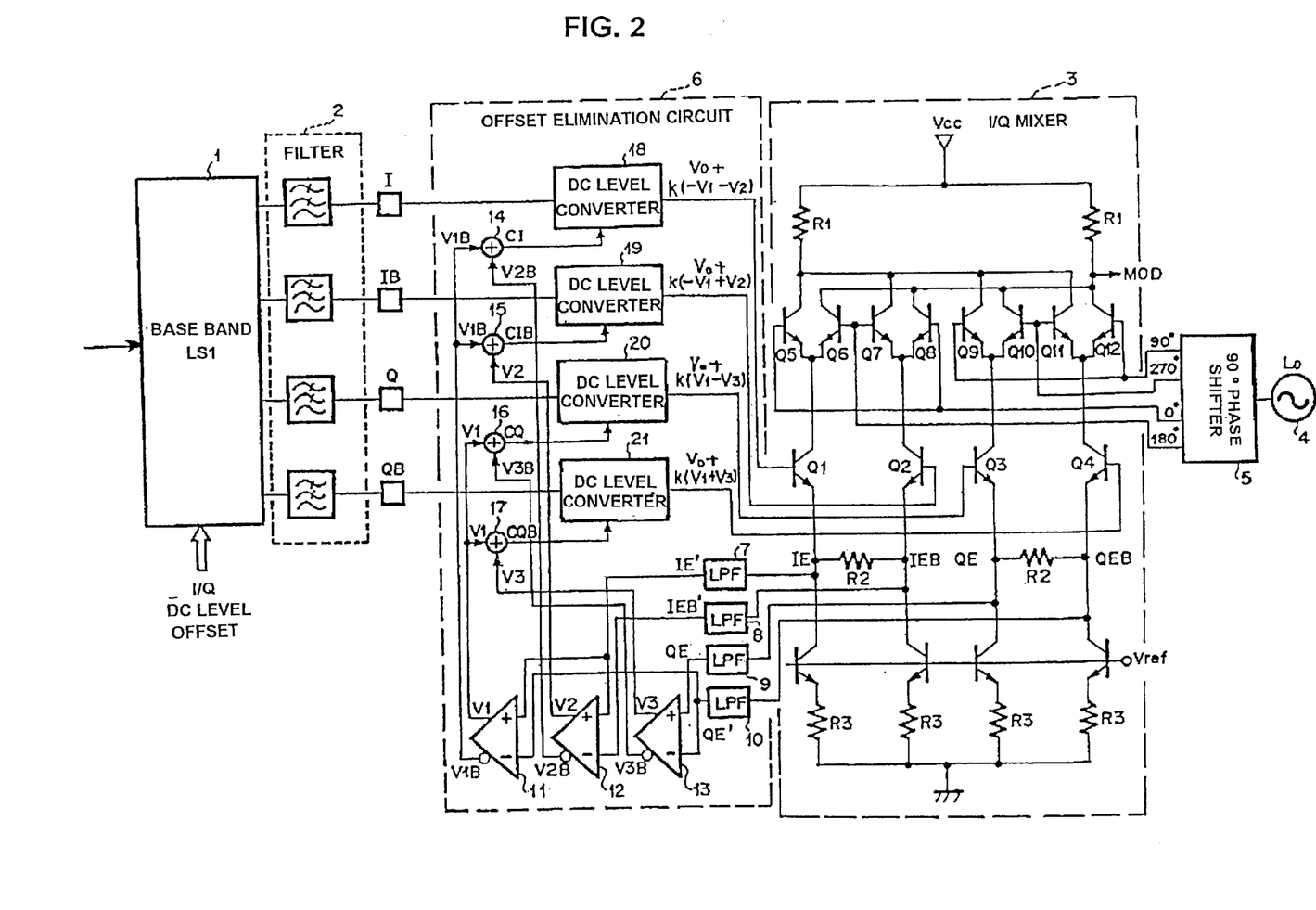
FIG. 2 is a diagram showing the specific structure of FIG. 1.

FIG. 2 is a diagram showing the specific structure of FIG. 1. The orthogonal modulator shown in FIG. 2 comprises a base band LSI 1 for generating an I signal, an IB signal, a Q signal and a QB signal, an offset elimination circuit 6 for eliminating a DC level by calculating a difference between the DC offset components of the base band signals through a filter 2, a 90° phase shifter 5 for modulating the phase of the output current of a carrier wave source 4 by 90°, and an I/Q mixer 3 of a Gilbert multiplier type, for example, for mixing the output signal of the offset elimination circuit 6 and a carrier wave output from the 90° phase shifter 5.

Moreover, the offset elimination circuit 6 includes low-pass filters (LPF) 7 to 10 for removing the AC components of base band components (IE, IEB, QE, QEB) in the I/Q mixer 3, a comparator 11 for comparing the DC offset component (IE) of the I signal through the low-pass filters 7 to 10 with the DC offset component (QE) of the Q signal, a comparator 12 for comparing the DC offset component (IE) of the I signal with the DC offset component (IEB) of the IB signal, a comparator 13 for comparing the DC offset component (QE) of the Q signal with the DC offset component (QEB) of the QB signal, an adder 14 for adding output signals V1B and V2B of the comparators 11 and 12, an adder 15 for adding V1B and V2, an adder 16 for adding V1 and V3B, an adder 17 for adding V1 and V3, and DC level conversion circuits 18 to 21 for removing signals obtained as a result of the additions of the adders 14 to 17 from each base band signal.

Figure 3:
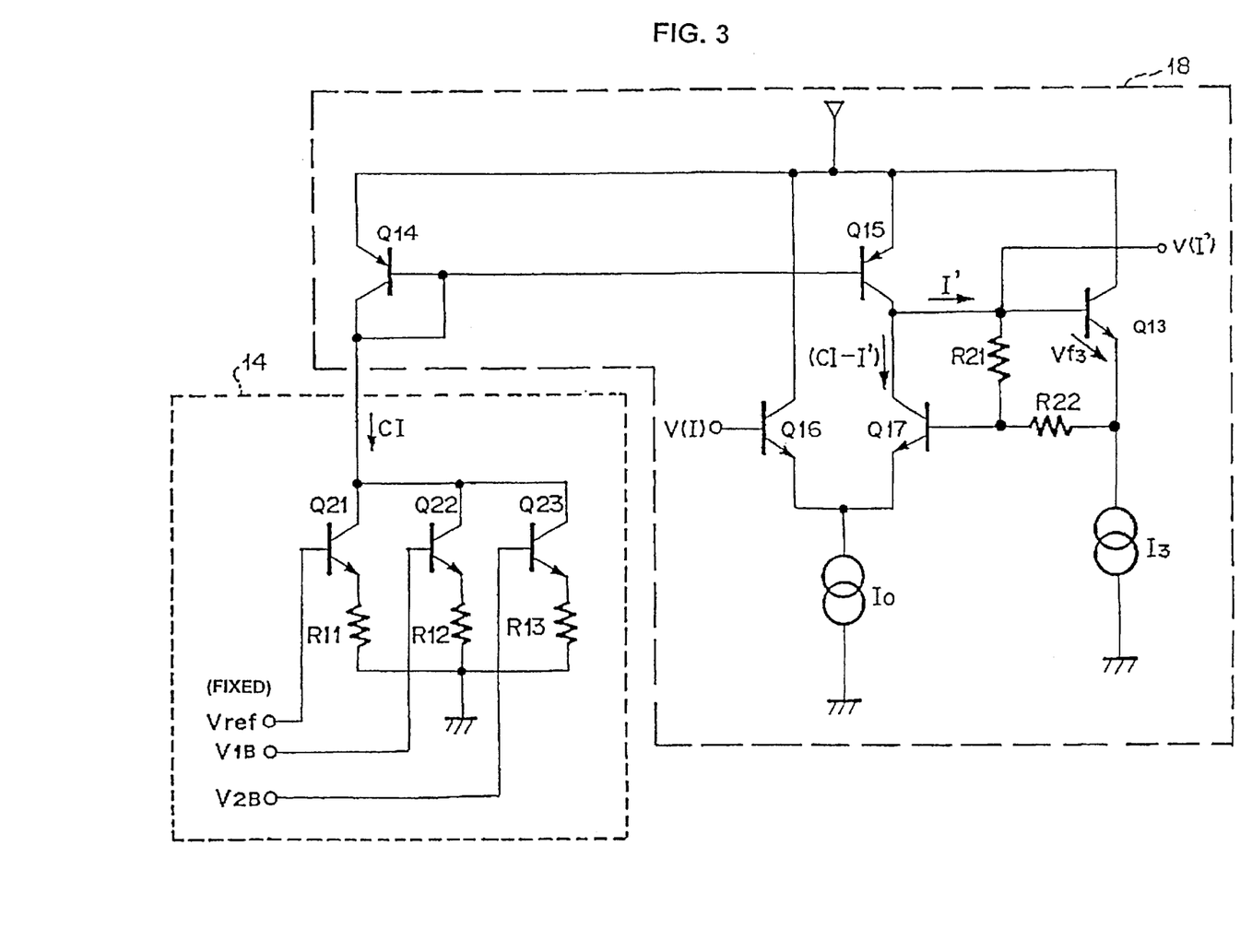
FIG. 3 is a diagram showing the structures of an adder and a DC level modulating circuit illustrated in FIG. 2.

FIG. 3 is a diagram showing the tructures of the addre 14 and the DC level conversion circuit 18. As shown in FIG. 3, the adder 14 includes input means for inputting a fixed reference voltage Vref and V1B and V2B outputted from the comparators 11 and 12, respectively, thereby generating a predetermined current CI. The DC level conversion circuit 18 includes transistors Q14 and Q15 constituting a differential amplifier, and means Q13 for level-shifting the I signal to the CI signal. The adders 15 to 17 and the DC level conversion circuits 19 to 21 also have the same structures as those shown in FIG. 3

Next, the operation of the orthogonal modulator according to the present invention is explained. The base band LSI 1 as shown in FIG. 2 inputs an I/Q DC level offset setting signal outputted from an external ROM which is not shown. In response to this signal, an I signal, a Q signal, an IB signal and a QB signal are generated.

The IB signal and the QB signal are obtained by inverting the phases of the I signal and the Q signal respectively, in order to operate the I/Q mixer 3 in good balance.

Each base band signal thus generated is inputted into the DC level conversion circuits 18 to 21 through the filter 2. Each of the DC level conversion circuits 18 to 21 eliminates a DC offset component. Then, the offset free signals (I, IB, Q, QB) are inputted into the bases (first terminals) of the transistors Q1 to Q4 as shown in FIG. 2. Concretely, (I, IB) are inputted into (Q1, Q2), while (Q, QB) are inputted into (Q3, Q4).

The offset free signals I, IB, Q, QB outputted from DC level conversion circuits 18 to 21, respectively are expressed in terms of $V_0$, V1, V2, V3, and k, where k is a circuit constant of the DC level conversion circuits 18 to 20, and ($V_0$, V1, V2, V3) are the average voltages or the center bias values of the carrier waves of which phases are 0°, 90°, 180°, and 270°, respectively.

$$I=V_0+k(-V1-V2)$$

$$IB=V_0+k(-V1+V2)$$

$$Q=V_0+k(V1-V3)$$

$$QB=V_0+k(V1+V3)$$

The 0°, 90°, 180°, and 270° carrier waves outputted from the carrier wave source 4 are modulated by the 90° phase shifter 5, and they are inputted into the bases of the transistors Q5 to Q12 of the I/Q mixer 3. The outputs from the emitters of the transistors (Q5, Q6), (Q7, Q8), (Q9, Q10), (Q11, Q12) are added to obtain the collector currents of Q1 to Q4, respectively.

Concretely, the 0° carrier wave and the 180° carrier wave are inputted into the bases (first terminals) of the transistors Q5 and Q6, and each emitter (third terminal) output current is the collector (second terminal) current of the transistor Q1. Similarly, the emitter output currents of Q7 and Q8 are the collector input current of Q2, the emitter output currents of Q9 and Q10 are the collector input current of Q3, and the emitter output currents of Q11 and Q12 are the collector input current of Q4.

As described above, the output signals of the DC level conversion circuits 18 to 21 are inputted into the gates (third terminals) of the transistors Q1 to Q4. Therefore, the output signals of the DC level conversion circuits 18 to 21 and the output signal of the 90° phase shifter 5 are added and are outputted from the emitters (third terminals) of the transistors Q1 to Q4.

The output signals of the emitters (third terminals) of the transistors Q1 to Q4 are inputted from node terminals QE, IE, IBE and QBE to the low-pass filters 7 to 10. The low-pass filters (LPFs) 7 to 10 remove the base band component of an input signal and output the DC offset component of each base band signal (the center DC bias value of an amplitude). Each node terminal and the low-pass filters 7 to 10 constitute the extraction means.

The DC offset component (IE) of the I signal and the DC offset component (QE) of the Q signal are outputted into the comparator 11. Then, the DC offset component (IE) of the I signal and the DC offset component (IEB) of the IB signal are outputted into the comparator 12, while the DC offset component (QE) of the Q signal and the DC offset component (QEB) of the QB signal are output to the comparator 13.

The comparators 11 to 13 compare the offset components of the input base band signals. The comparator 11 outputs V1 and V1B, the comparator 12 outputs V2 and V2B, and the comparator 13 outputs V3 and V3B.

The signals V1B and V2B outputted from comparators 11 and 12, respectively, are inputted into the adder 14. V1B and V2 are inputted into the adder 15. V1 and V3B are inputted into the adder 16. V1 and V3 are input to the adder 17. The adders 14 to 17 add two input signals and output addition signals CI, CIB, CQ and CQB to the DC level conversion circuits 18 to 21.

The DC level conversion circuits 18 to 21 subtract the signals outputted from the adders 14 to 17 from each base band signal outputted from the filter 2. The outputs from the DC level conversion circuits 18 to 21 are offset free signals which are inputted into the I/Q mixer 3 as shown in FIG. 2.

More specifically, in order to remove the DC offset component from the base band signal, the V1B and V2B and the fixed reference voltage Vref are inputted into the adder 14 so that the addition signal CI as shown in FIG. 3 is obtained. The addition signal CI is also sent to the transistor Q15 side through the current mirror circuit. A signal output from the collector terminal of the transistor Q15 is I' toward the base of the transistor Q13 of level shift means as shown in FIG. 3. The adders 15 to 17 and the DC level conversion circuits 19 to 21 also remove the DC offset components in the same manner.

By the removal of the DC offset component, also in the case in which external voltages of Vcc is approximately 3.0 V and $V_0$ is approximately 1.7 V are set and an external I/Q DC input level is reduced from 1.5 V to 1.35 V, $V_0$=1.7V is maintained to be almost constant and only the DC offset component is corrected for $V_0$.

In the present invention, the I/Q mixer 3 is not limited to the Gilbert multiplier.

Further, the bipolar transistors may be replaced by other transistors such as MOS transistors.

Figures 4A, 4B:
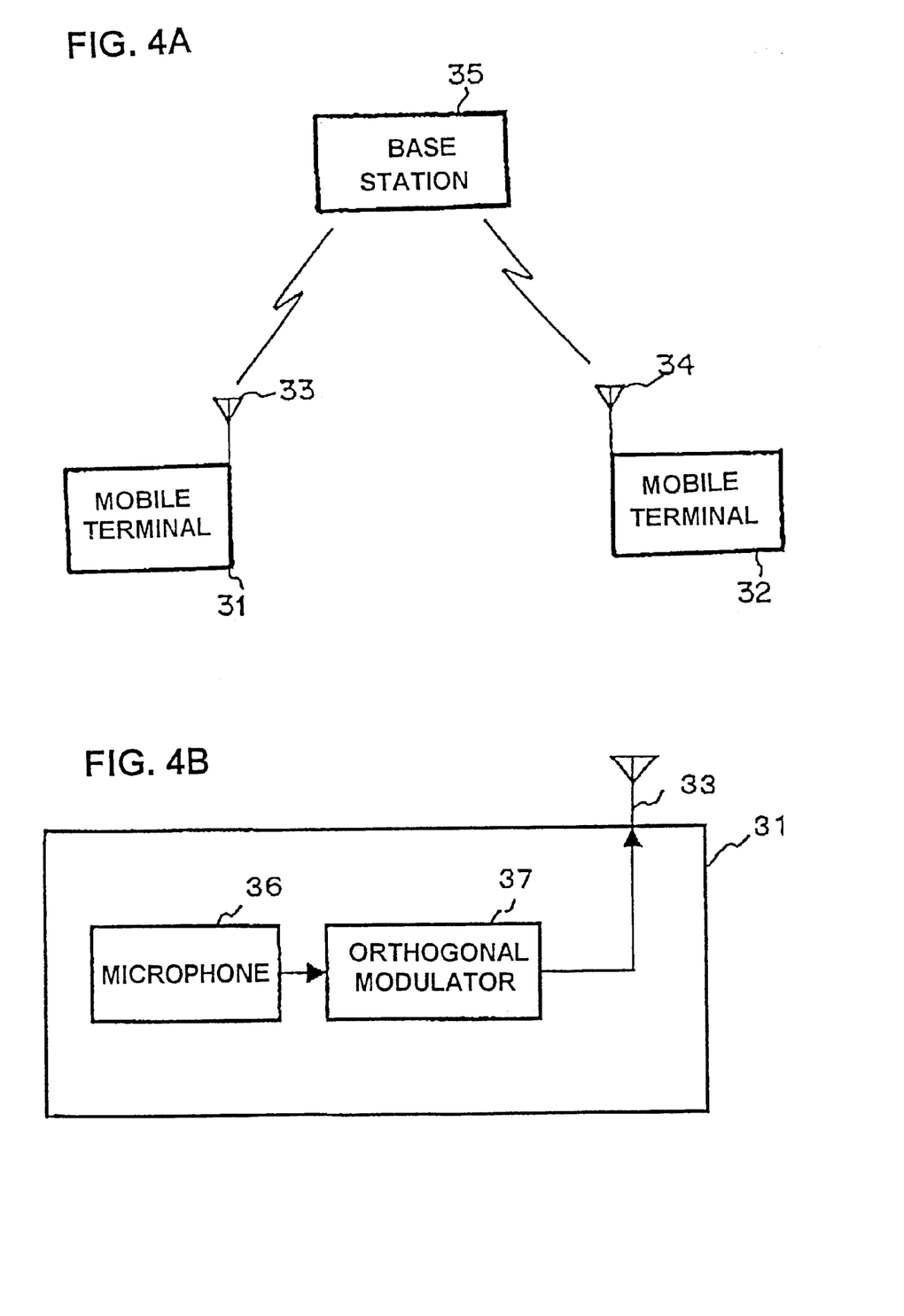
FIGS. 4A and 4B are block diagrams showing the structures of a communication system and a mobile terminal of the present invention.

FIG. 4A is a block diagram of a communication system of the present invention, wherein the mobile terminals employ the above explained orthogonal modulator. The communication system as shown in FIG. 4A includes mobile terminals 31 and 32 such as a cellular having the orthogonal modulators, and a base station 35 for transmitting and receiving electric waves between the mobile terminal 31 and the mobile terminal 32. Moreover, the mobile terminals 31 and 32 have antennas 33 and 34 for transmitting and receiving electric waves to and from the base station 35.

FIG. 4B is a diagram showing the internal structure of a mobile terminal 31 illustrated in FIG. 4A.

The mobile terminal 31 as shown in FIG. 4B includes voice collecting means such as a microphone 36 for a voice generated by a user in addition to the antenna 33, and an orthogonal modulator 37 for orthogonally modulating the user's voice signal collected through the microphone 36.

The operation of the communication system of the present invention is explained, by an example, wherein the electric waves are transmitted from the mobile terminal 31 to the mobile terminal 32. For example, when the user of the mobile terminal 31 first generates a voice, the voice is collected through the microphone 36 of the mobile terminal 31.

The voice signal is inputted into the base band LSI as shown in FIG. 2 of the orthogonal modulator 37 and is converted into a base band signal. Then, the base band signal from which the DC offset component is removed by the offset elimination circuit is output to the I/Q mixer.

The I/Q mixer mixes each base band signal from which the DC offset component is removed and a carrier wave, and outputs an MOD signal. The MOD signal is amplified by a power amplifier which is not shown, or the like, and is transmitted to the base station 35 through the antenna 33.

The base station 35 receives the electric waves transmitted from the mobile terminal 31, and transmits the same electric waves to the mobile terminal 32. The mobile terminal 32 receives the electric waves from the antenna 34, converts the base band signal into a voice signal through a demodulator which is not shown, and outputs the voice signal through a speaker which is not shown.

What is claimed is:

1. An orthogonal modulator, wherein an offset between an in-phase component (I signal) and a quadrature component (Q signal) is eliminated, which comprises:

a generation means for generating base band signals on the basis of said I signal, said Q signal, an inverted signal of said I signal (IB) and an inverted signal of said Q signal (QB);

a mixing means for mixing said base band signals and a plurality of carrier waves;

an extraction means for extracting DC levels of said I signal (I), said inverted signal of said I signal (IB), said Q signal (Q) and said inverted signal of said Q signal (QB) in the signal outputted from said mixing means;

a comparison means for comparing said DC levels of said I, IB, Q and QB signals with each other;

an addition means for adding a comparison result to another comparison result; and an offset elimination means for subtracting addition results from said I, IB, Q and QB signals before said I, IB, Q and QB signals are applied to said mixing means.

2. The orthogonal modulator according to claim 1, wherein:

phases of said plurality of carrier waves are 0°, 90°, 180°, and 270°;

said I, IB, Q, and QB signals outputted from said offset elimination means are such that;

$I = V_0 + k(-V1 - V2)$ $IB = V_0 + k(-V1 + V2)$ $Q = V_0 + k(V1 - V3)$ $QB = V_0 + k(V1 + V3)$ where k is a circuit constant of said offset elimination means, and ($V_0$, V1, V2, V3) are the average voltages of said carrier waves of which phases are (0°, 90°, 180°, and 270°), respectively.

3. The orthogonal modulator according to claim 1, wherein said mixing means includes a plurality of I/Q differential pairs, each of which having:

a first terminal for inputting one of said base band signals outputted from said offset elimination means;

a second terminal for inputting one of said carrier waves; and a third terminal for outputting a mixed signal of said base band signals and said carrier waves.

4. The orthogonal modulator according to claim 3, wherein said extraction means includes:

a combining means for combining outputs from all of said third terminals; and a removing means for removing an AC component included in the combined outputs.

5. A mobile terminal, wherein voice signal is transmitted on carrier waves under orthogonal modulation, which comprises:

an orthogonal modulation means wherein an offset between an in-phase component (I signal) and a quadrature component (Q signal) is eliminated, which comprises:

a generation means for generating base band signals on the basis of said I signal, said Q signal, an inverted signal of said I signal (IB) and an inverted signal of said Q signal (QB);

a mixing means for mixing said base band signals and a plurality of carrier waves;

an extraction means for extracting DC levels of said I signal (I), said inverted signal of said I signal (IB), said Q signal (Q) and said inverted signal of said Q signal (QB) in the signal outputted from said mixing means;

a comparison means for comparing said DC levels of said I, IB, Q and QB signals with each other;

an addition means for adding a comparison result to another comparison result; and an offset elimination means for subtracting addition results from said I, IB, Q and QB signals before said I, IB, Q and QB signals are applied to said mixing means; and a transmission means for transmitting an output from said mixing means.

6. A communication system, wherein communication signals are transmitted on carrier waves under orthogonal modulation, which comprises:

a plurality of mobile terminals, each of which comprises:

an orthogonal modulation means wherein an offset between an in-phase component (I signal) and a quadrature component (Q signal) is eliminated, which comprises:

a generation means for generating base band signals on the basis of said I signal, said Q signal, an inverted signal of said I signal (IB) and an inverted signal of said Q signal (QB);

a mixing means for mixing said base band signals and a plurality of carrier waves;

an extraction means for extracting DC levels of said I signal (I), an inverted signals of said I signal (IB), said Q signal (Q) and an inverted signal of said Q signal (QB) in the signal outputted from said mixing means;

a comparison means for comparing said DC levels of said I, IB, Q and QB signals with each other;

an addition means for adding a comparison result to another comparison result; and an offset elimination means for subtracting addition results from said I, IB, Q and QB signals before said I, IB, Q and QB signals are applied to said mixing means; and a transmission means for transmitting an output from said mixing means; and a base station for receiving and transmitting communication signals from said mobile terminals.

* * * * *